United States Patent
Shin et al.

(10) Patent No.: US 8,045,133 B2
(45) Date of Patent: Oct. 25, 2011

(54) ELECTRICALLY-DRIVEN LIQUID CRYSTAL LENS AND DISPLAY DEVICE USING THE SAME

(75) Inventors: Hyun Ho Shin, Anyang-si (KR); Sung Min Jung, Incheon-si (KR)

(73) Assignee: LG Display Co., Ltd., Seoul (KR)

( * ) Notice: Subject to any disclaimer, the term of this patent is extended or adjusted under 35 U.S.C. 154(b) by 256 days.

(21) Appl. No.: 12/216,437

(22) Filed: Jul. 3, 2008

(65) Prior Publication Data
US 2009/0015739 A1    Jan. 15, 2009

(30) Foreign Application Priority Data
Jul. 5, 2007    (KR) .......................... 10-2007-067519

(51) Int. Cl.
 G02B 1/06    (2006.01)
 G02F 1/1335    (2006.01)
 G02F 1/13    (2006.01)
(52) U.S. Cl. ........................ 349/200; 349/15; 359/665
(58) Field of Classification Search ................ 349/15, 349/200; 359/665–667
See application file for complete search history.

(56) References Cited

U.S. PATENT DOCUMENTS
| 5,400,157 | A | * | 3/1995 | Won | 349/152 |
| 5,853,822 | A | * | 12/1998 | Lyu | 428/1.2 |
| 6,046,787 | A | * | 4/2000 | Nishiguchi | 349/129 |
| 2004/0109101 | A1 | * | 6/2004 | Kim et al. | 349/44 |

* cited by examiner

*Primary Examiner* — Mark Robinson
*Assistant Examiner* — Michael Inadomi
(74) *Attorney, Agent, or Firm* — McKenna Long & Aldridge, LLP

(57) ABSTRACT

An electrically-driven liquid crystal lens, which can reduce crosstalk caused at the center of an electrode, includes first and second substrates arranged opposite each other and defined, respectively, with a plurality of lens regions corresponding to each other, first electrodes formed on the first substrate between centers of the respective neighboring left and right lens regions on the first substrate, a black matrix layer formed on the first substrate to correspond to edges of the respective lens regions, the black matrix layer having a first width, second electrodes formed on the first substrate to correspond to the edges of the respective lens regions, the second electrodes having a second width smaller than the first width, a third electrode formed throughout the second substrate, and a liquid crystal layer interposed between the first substrate and the second substrate.

13 Claims, 8 Drawing Sheets

SHADING REGION

AVAILABLE PHASE PLANE

ELECTRICALLY-DRIVEN LIQUID CRYSTAL LENS AND DISPLAY DEVICE USING THE SAME

This application claims the benefit of the Korean Patent Application No. P2007-067519, filed on Jul. 5, 2007, which is hereby incorporated by reference for all purposes as if fully set forth herein.

BACKGROUND OF THE INVENTION

1. Field of the Invention

The present invention relates to an electrically-driven liquid crystal lens, and more particularly, to an electrically-driven liquid crystal lens, which can reduce crosstalk caused at the center of an electrode, and a display device using the same.

2. Discussion of the Related Art

Nowadays, services for rapid dissemination of information, which will be constructed on the basis of high-speed information communication networks, have been developed from a simple "listening and speaking" service, such as current telephones, to a "watching and listening" multimedia type service on the basis of digital terminals used for high-speed processing of characters, voice and images, and are expected to be ultimately developed to cyberspace real 3-dimensional stereoscopic information communication services enabling virtual reality and stereoscopic viewing.

In general, stereoscopic images representing 3-dimensions are realized based on the principle of stereo-vision via the viewer's eyes. However, since the viewer's eyes are spaced apart from each other by about 65 mm, i.e. have a binocular parallax, the left and right eyes perceive slightly different images due to a positional difference therebetween. Such a difference of images due to the positional difference of both the eyes is called binocular disparity. Also, a 3-dimensional stereoscopic image display device is designed on the basis of binocular disparity, allowing the left eye to watch only an image for the left eye and the right eye to watch only an image for the right eye. Specifically, the left and right eyes watch different two-dimensional images, respectively. If the two images are transmitted to the brain through the retina, the brain accurately fuses the images, giving the impression of reproducing a real 3-dimensional image. This ability is conventionally called stereography, and a display device utilizing this ability is called a stereoscopic display device.

Meanwhile, stereoscopic display devices can be classified according to components of a 3-dimensional reproduction lens. For example, a lens constructed using a liquid crystal layer is called a liquid crystal lens, which will be driven by an electric field. Hereinafter, this kind of lens is called an electrically-driven liquid crystal lens.

Conventionally, a liquid crystal display device includes two electrodes opposite each other, and a liquid crystal layer formed between the two electrodes. Liquid crystal molecules of the liquid crystal layer are driven by an electric field generated when a voltage is applied to the two electrodes. The liquid crystal molecules have polarization and optical anisotropy properties. Here, the polarization property is that, when a liquid crystal molecule is placed within an electric field, charges in the liquid crystal molecule are gathered to opposite sides of the liquid crystal molecule, whereby a molecular arrangement direction is converted according to an applied electric field. The optical anisotropy property is that, owing to an elongated configuration of liquid crystal molecules and the above-described molecular arrangement direction, the incidence direction of incident light is changed, or the path of light to be emitted or polarization degree is changed according to polarization conditions. Accordingly, the liquid crystal layer represents a difference of transmissivity by a voltage applied to the two electrodes, and an image can be displayed using the transmissivity difference of pixels.

Recently, there has been developed an electrically-driven liquid crystal lens in which a liquid crystal layer serves as a lens using the above-described properties of liquid crystal molecules.

Specifically, a lens controls the path of incident light according to a given position using a difference between an index of refraction of a lens constituent material and air. If different voltages are applied to different positions of the liquid crystal layer to drive the liquid crystal layer by different electric fields, the incident light into the liquid crystal layer undergoes different phase variations, and as a result, the light crystal layer can control the path of incident light like an actual lens.

Hereinafter, a related art electrically-driven liquid crystal lens will be described with reference to the accompanying drawings.

FIG. 1 is a sectional view illustrating a related art electrically-driven liquid crystal lens, and FIG. 2 is a graph illustrating phase variation of incident light depending on position when light passes through the conventional electrically-driven liquid crystal lens.

As shown in FIGS. 1 and 2, the related art electrically-driven liquid crystal lens includes first and second substrates 10 and 20 arranged opposite each other, and a liquid crystal layer 30 formed between the first substrate 10 and the second substrate 20. Here, first electrodes 11 are formed on the first substrate 10 and are spaced apart from one another by a first interval. In these neighboring first electrodes 11, a distance from the center of one of the first electrodes 11 to the center of the next first electrode 11 is called a pitch. Repeating the same pitch for each of the first electrodes forms a pattern.

Second electrodes 21 are formed throughout a surface of the second substrate 20 opposite the first substrate 20. The first and second electrodes 11 and 21 are made of transparent metal. The liquid crystal layer 30 is formed in a space between the first electrodes 11 and the second electrode 21. Liquid crystal molecules constituting the liquid crystal layer 30 have a property of responding to the strength and distribution of an electric field, and thus, have a phase distribution similar to the electrically-driven liquid crystal lens as shown in FIG. 2.

The above-described electrically-driven liquid crystal lens is formed under the condition of applying a high voltage to the first electrode 11 and grounding the second electrode 21. Under these voltage conditions, the vertical electric field is strongest at the center of the first electrode 11, and the strength of the vertical electric field decreases away from the first electrode 11. Thereby, when the liquid crystal molecules constituting the liquid crystal layer 30 have a positive dielectric constant anisotropy, the liquid crystal molecules are arranged according to the electric field in such a way that they are upright at the center of the first electrode 11 and tilt closer to the horizontal plane with increasing distance from the first electrode 11. As a result, in view of light transmission, an optical path is shortened at the center of the first electrode 11, and is lengthened with increasing distance from the first electrode 11. Representing the length variation of the optical path using a phase plane, the electrically-driven liquid crystal lens shown in FIG. 2 has light transmission effects similar to a parabolic lens having a paraboloidal surface.

The above-described electrically-driven liquid crystal lens can be accomplished by providing electrodes on both substrates, respectively, with liquid crystals interposed therebetween and applying a voltage to the electrodes, eliminating the need for a lens having a physically formed paraboloidal (convex) surface.

However, referring to FIG. 2, it can be appreciated that achieving the same phase plane as a parabolid using the electrically-driven liquid crystal lens when a voltage is applied to realize an image is difficult, and in particular, the phase plane seriously deviates from the profile of the parabolic lens at a section corresponding to the center of the first electrode, i.e. at a lens edge. Deviation of the phase plane from the parabolic lens means that light transmission at the corresponding region is carried out differently from the parabolic lens. This may result in a distorted image upon realization of a 3-dimensional screen. Here, the center of the first electrode corresponds to the lens edge, and thus, the lens undergoes profile distortion at the lens edge (i.e. at the first electrode). This profile distortion causes crosstalk, i.e. unintended signals, and the signal distortion region is called an edge error region.

The above-described related art electrically-driven liquid crystal lens has the following problems.

Upon formation of the electrically-driven liquid crystal lens, the lens edge has a seriously deviated phase from the profile of a lens having a physically formed parabolic or convex surface, causing distortion in the index of refraction for 3-dimensional imaging. This results in crosstalk at the lens edge, making it impossible to display a normal image.

SUMMARY OF THE INVENTION

Accordingly, the present invention is directed to an electrically-driven liquid crystal lens and a display device using the same that substantially obviate one or more problems due to limitations and disadvantages of the related art.

An advantage of the present invention is to provide an electrically-driven liquid crystal lens, which can reduce crosstalk caused at the center of an electrode, and a display device using the same.

Additional features and advantages of the invention will be set forth in the description which follows, and in part will apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, an electrically-driven liquid crystal lens includes: first and second substrates arranged opposite each other and defined, respectively, with a plurality of lens regions corresponding to each other; first electrodes formed on the first substrate between centers of the respective neighboring left and right lens regions on the first substrate; a black matrix layer formed on the first substrate to correspond to edges of the respective lens regions, the black matrix layer having a first width; second electrodes formed on the first substrate to correspond to the edges of the respective lens regions, the second electrodes having a second width smaller than the first width; a third electrode formed throughout the second substrate; and a liquid crystal layer interposed between the first substrate and the second substrate, and a display device includes the electrically-driven liquid crystal lens.

It is to be understood that both the foregoing general description and the following detailed description are exemplary and explanatory and are intended to provide further explanation of the invention as claimed.

In another aspect of the present invention, A display device includes: a display panel to emit 2-dimensional first and second images; and an electrically-driven liquid crystal lens disposed on the display panel and including: first and second substrates arranged opposite each other and defined, respectively, with a plurality of lens regions corresponding to each other; first electrodes formed on the first substrate between centers of the respective neighboring left and right lens regions on the first substrate; a black matrix layer formed on the first substrate to correspond to edges of the respective lens regions, the black matrix layer having a first width; second electrodes formed on the first substrate to correspond to the edges of the respective lens regions, the second electrodes having a second width smaller than the first width; a third electrode formed throughout the second substrate; and a liquid crystal layer interposed between the first substrate and the second substrate.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principles of the invention.

In the drawings.

DETAILED DESCRIPTION OF THE INVENTION

Reference will now be made in detail to an embodiment of the present invention, examples of which are illustrated in the accompanying drawings. Wherever possible, the same reference numbers will be used throughout the drawings to refer to the same or like parts.

Figure 1:
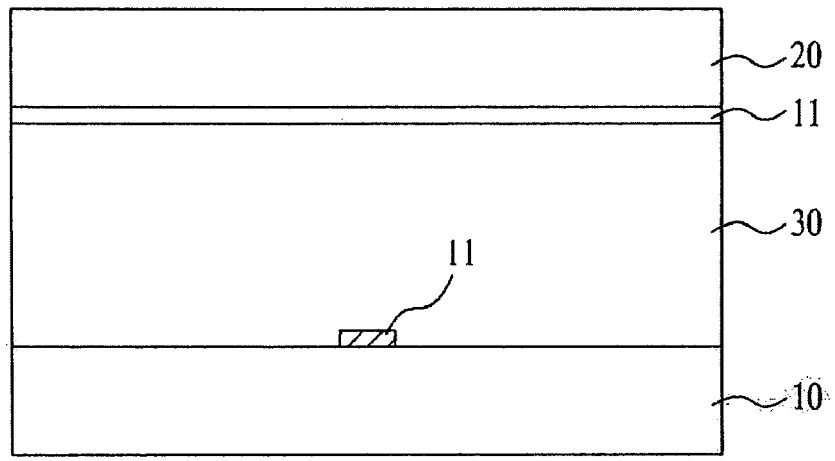
FIG. 1 is a sectional view illustrating a related art electrically-driven liquid crystal lens.
Figure 2:
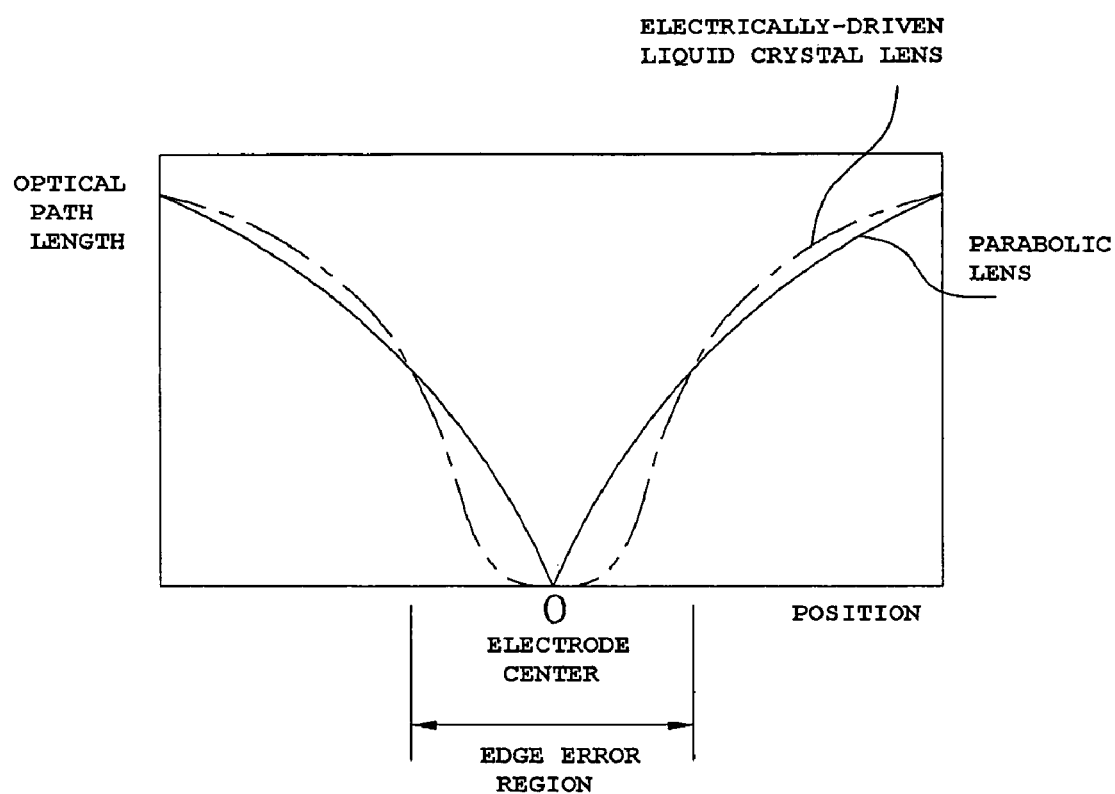
FIG. 2 is a graph illustrating phase variation of incident light depending on positions when light passes through the related art electrically-driven liquid crystal lens.
Figure 3:
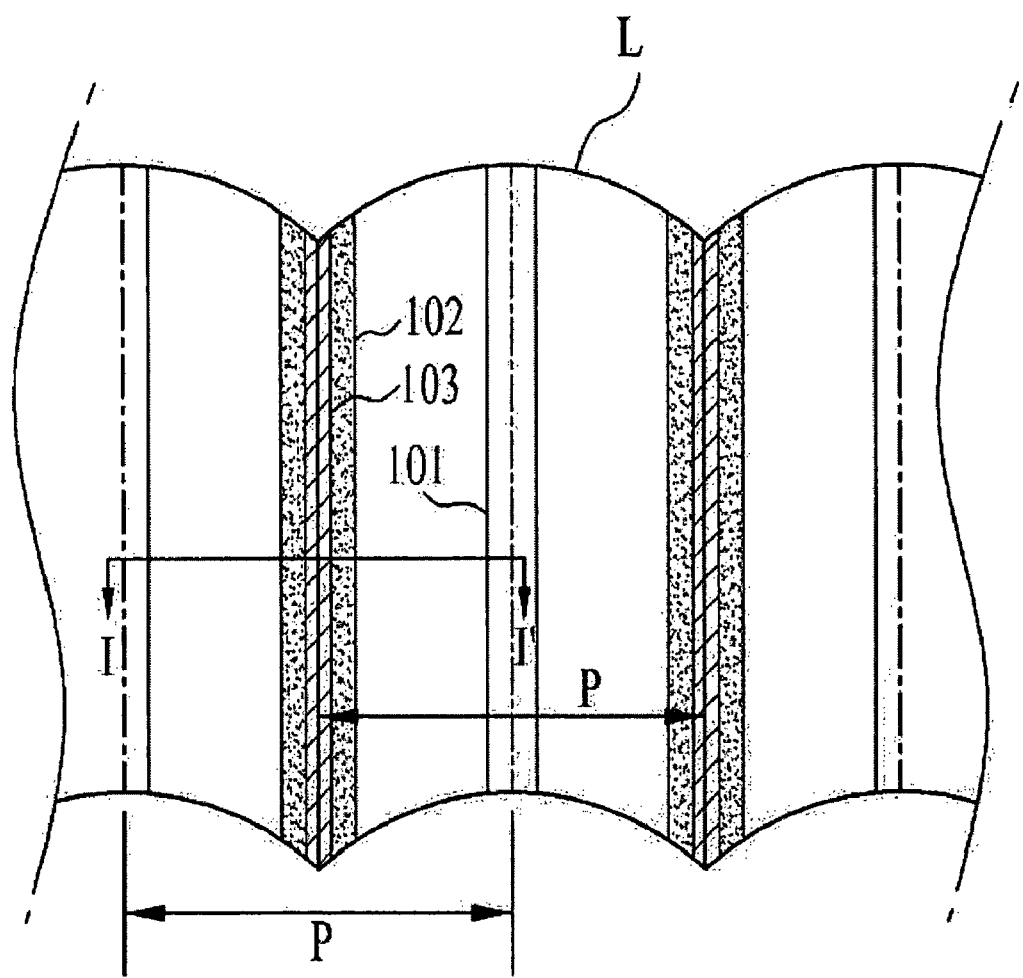
FIG. 3 is a plan view illustrating an electrically-driven liquid crystal lens according to an embodiment the present invention.
Figure 4:
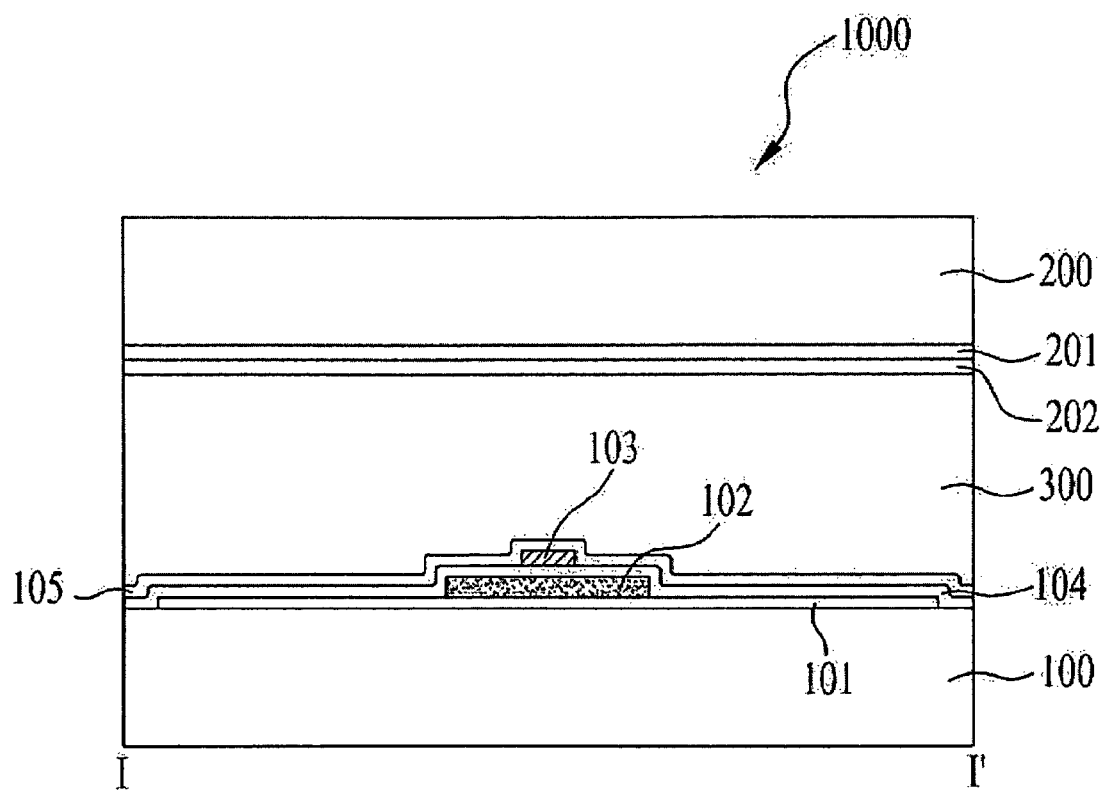
FIG. 4 is a structural sectional view taken along the line I-I' of FIG. 3.

FIG. 3 is a plan view illustrating an electrically-driven liquid crystal lens, and FIG. 4 is a structural sectional view taken along the line I-I' of FIG. 3.

As shown in FIGS. 3 and 4, the electrically-driven liquid crystal lens, which is designated by reference numeral 1000, includes first and second substrates 100 and 200 arranged opposite each other and formed at their corresponding positions with lens regions L, and a liquid crystal layer 300 interposed between the first substrate 100 and the second substrate 200. Here, the plurality of lens regions L are formed at both the first and second substrates 100 and 200, respectively, to correspond to each other. The respective lens regions L are defined to have a width corresponding to a pitch, and the lens regions L, having the same pitch as each other, are periodically repeated in a given direction (i.e. in a crosswise direction as shown in FIG. 3). In this case, the pitch represents a crosswise width of each lens region L, and the lens region L is a region, which does not have the profile of a physically formed lens such as the shown convex lens and functions as a lens wherein liquid crystals are arranged according to applied electric field.

The first substrate 100 is formed thereon with first electrodes 101, which are spaced apart from centers of the respective neighboring left and right lens regions L by a first distance, respectively. Also, the first substrate 100 includes a black matrix layer 102, which is formed at edges of the respective lens regions L, i.e. at the centers of the respective first electrodes 101 to come into contact with the first electrodes 101, an insulating layer 104, which is formed on the first substrate 100 including the black matrix layer 102, second electrodes 103, which are formed on the insulating layer 104 to correspond to the edges of the respective liquid crystal lens regions, and a first alignment layer 105 formed on the insulating layer 104 including the second electrodes 103.

A third electrode 201 is formed throughout the second substrate 200, and a second alignment layer 202 is formed on the second substrate 200 including the third electrode 201. Here, the first electrodes 101 are configured to have a greater width than a width of the second electrodes 103. As shown, the first electrodes 101 may be spaced apart from the center of the respective neighboring left and right lens regions L by a first distance. As occasion demands, the first electrodes 101 may be formed throughout the first substrate 100 such that the first distance becomes zero. The first electrodes 101 are provided with a greater width than the second electrodes 103 for the following reasons. In the related art, to operate the liquid crystal layer 300, a high voltage and a threshold voltage are applied to the second electrodes 103 and the first electrodes 101, respectively, and a ground voltage is applied to the third electrode 201 opposite the first and second electrodes 101 and 103. Therefore, since a lower voltage is applied to the first electrodes 101 than the second electrodes 103, in order to allow the first electrodes 101 to generate a smooth electric field in cooperation with the third electrode 201 and also, to have an effect on the adjustment of a sag of the electrically-driven liquid crystal lens defined in the liquid crystal layer 300 in conjunction with the second electrodes 103, the first electrodes 101 must be wider than the second electrodes 103. In this case, the threshold voltage applied to the first electrodes 101 is an AC square wave voltage having a peak value represented by $$V = \pi \sqrt{\frac{K1}{\Delta\varepsilon\varepsilon 0}}$$

(where, $\Delta\varepsilon$ is a liquid crystal dielectric constant anisotropy, K1 is the Splay modulus of elasticity, and $\varepsilon_o$ is a free-space dielectric constant). Also, the high voltage applied to the second electrodes 103 is an AC square wave voltage having a peak value of 2.5V to 10V.

In addition, the black matrix layer 102 is formed to have a greater width than the width of the second electrodes 103. In this case, the width of the first electrodes 101 and the width of the black matrix layer 102 substantially have no relation with each other. However, since the black matrix layer 102 serves to block light, it is preferred that the black matrix layer 102 have only a width required to cover an error edge region so as not to unnecessarily block light at sections exhibiting little or no error.

FIG. 4 is a sectional view illustrating a section between the centers of the neighboring left and right lens regions, and more particularly, is a sectional view of a width corresponding to a pitch. In this case, if a high voltage and a threshold voltage are applied to the second electrodes 103 and the first electrodes 101, respectively, and a ground voltage is applied to the third electrode 201 opposite the first and second electrodes 101 and 103, a refractive index difference occurs according to alignment of liquid crystals by an electric field, whereby an electrically-driven liquid crystal lens, which has phase characteristics of respective half paraboloidal surfaces of the neighboring left and right lens regions L about the centers of the respective second electrodes 103, can be accomplished. As the same pattern is repeated in a given direction (i.e. in a crosswise direction), the parabolic liquid crystal lenses can be successively formed with a given pitch interval.

Meanwhile, although not shown, outer rim regions of the first and second substrates 100 and 200 are provided with seal patterns (not shown), to support both the first and second substrates 100 and 200. The liquid crystal layer 300 between the first substrate 100 and the second substrate 200 must have a sufficient thickness equal to approximately 15 μg/m to 30 μm for formation of the electrically-driven liquid crystal lens having a sufficient phase. To stably maintain the thickness of the liquid crystal layer 300, ball spacers or column spacers can be further formed to support a cell gap between the first substrate 100 and the second substrate 200. In this case, it is advantageous to position the spacers so as not to distort the phase of the electrically-driven liquid crystal lens.

Although the drawings illustrate the case wherein liquid crystal molecules constituting the liquid crystal layer 300 have a positive dielectric constant anisotropy, even when a shifted electrically-driven liquid crystal lens differently from the electrically-driven liquid crystal lens shown in FIG. 3 is intended, or even when an electrically-driven liquid crystal lens having the same effect as the shown electrically-driven liquid crystal lens is formed, a material having a negative dielectric constant anisotropy can be used by changing the arrangement of the electrodes disposed on the first substrate 100 or by inverting positions of the first and second substrates 100 and 200.

Meanwhile, the electrically-driven liquid crystal lens 1000 can serve as a lens used for 3-dimensional imaging, and as occasion demands, can be located at the upper surface of a display device having the function of 2-dimensional imaging, thereby serving to convert a 2-dimensional image into a 3-dimensional image for display of the 3-dimensional image. Also, on the basis of the property of transmitting light when no voltage is applied, the electrically-driven liquid crystal lens can achieve a switching function to display a 2-dimensional image when no voltage is applied and to display a 3-dimensional image according to applied voltage. This electrically-driven liquid crystal lens can be used together with a 2-dimensional image display device located at the lower surface thereof. Specifically, by virtue of the switching function between 2-dimensional/3-dimensional imaging, the electrically-driven liquid crystal lens can display a stereoscopic (3-dimensional) image using a 2-dimensional image signal emitted from the display device located at the lower surface thereof according to applied voltage, and also, can display a 2-dimensional image by directly transmitting the 2-dimensional image emitted from the display device when no voltage is applied.

In this case, to display a 2-dimensional image when no voltage is applied, the first and second substrates 100 and 200 are subjected to rubbing to enable light transmission in an initial state under which no voltage is applied. Specifically, to provide the liquid crystal layer 300 with light-transmission properties in the initial state under which no voltage is applied, the first alignment layer 105 is subjected to rubbing toward the second electrodes 103, and the second alignment layer 202 is subjected to rubbing in a direction intersecting the direction in which the first alignment layer 105 is rubbed, whereby the first and second alignment layers 105 and 202 have an anti-parallel relationship.

The liquid crystal layer 300 has the same effect as a parabolic lens having a paraboloidal surface when the voltages are applied to the respective electrodes. On the basis of the above-described principle, the electrically-driven liquid crystal lens can achieve 3-dimension reproduction of an image signal. In particular, as the electrically-driven liquid crystal lens of the present invention is designed such that lens edges (in the vicinity of the second electrodes) exhibiting serious distortion are covered by the black matrix layer 102, crosstalk caused in the vicinity of the second electrodes 103 when erroneous information is applied to the user's left and right eyes is reduced.

Meanwhile, considering a vertical distance from the first and second electrodes 101 and 103 to the third electrode 201, the second electrodes 103 are closer to the third electrode 201 than the first electrodes 101. Also, since a relatively high voltage is applied to the second electrodes 103, there occurs a stronger electric field effect between the second electrodes 103 and the third electrode 201 under the influence of a voltage difference. Here, as a relatively low voltage is applied to the first electrodes 101, the first electrodes 101 function to control an electric field of a section where no second electrodes 103 are formed and also, provides a gentle curve to the electric field. Also, together with the second electrodes 103, the first electrodes 101 can adjust the magnitude of a phase of the electrically-driven liquid crystal lens obtained based on the alignment characteristics of liquid crystals affected by an electric field.

The first to third electrodes 101, 103 and 201 are made of transparent metal, and thus, can carry out normal transmission at regions having no black matrix layer 102. As occasion demands, since the second electrodes 103 are located at positions to be covered by the black matrix layer 102, the second electrodes 103 may be made of light-tight opaque metal. Reduction of a width of the black matrix layer 102 to a value close to a width of the second electrodes 103 is possible when the second electrodes 103 are made of light-tight opaque metal and thus, have a shading function.

The first and second electrodes 101 and 103 take the form of bars extending in a direction perpendicular to the plane of the drawing. The second electrodes 103 have the magnitude of one-tenths assuming that the pitch (crosswise width) of the lens region has a value of 1. The width of the black matrix layer 102 is greater than or equal to the width of the second electrodes 103, to cover sections where the second electrodes 103 are formed. Also, the width of the first electrodes 101 is slightly less than or equal to the pitch of the lens region, and preferably, is more than about eight-tenths of the pitch of the lens region.

Each lens region is configured to correspond to pixels of a display panel (See FIG. 9) which is located at the lower surface of the electrical-driven liquid crystal lens. That is, a plurality of pixels can correspond to a single lens region. Also, the respective lens regions can be tilted by a predetermined angle relative to the pixels. As occasion demands, the respective lens regions can be arranged in a stepwise manner with respect to the pixels. For example, an $n^{th}$ horizontal line and $n+1^{th}$ horizontal line are shifted by a predetermined width.

Hereinafter, the phase variation of the liquid crystal lens will be described with reference to simulation graphs.

Figure 5A:
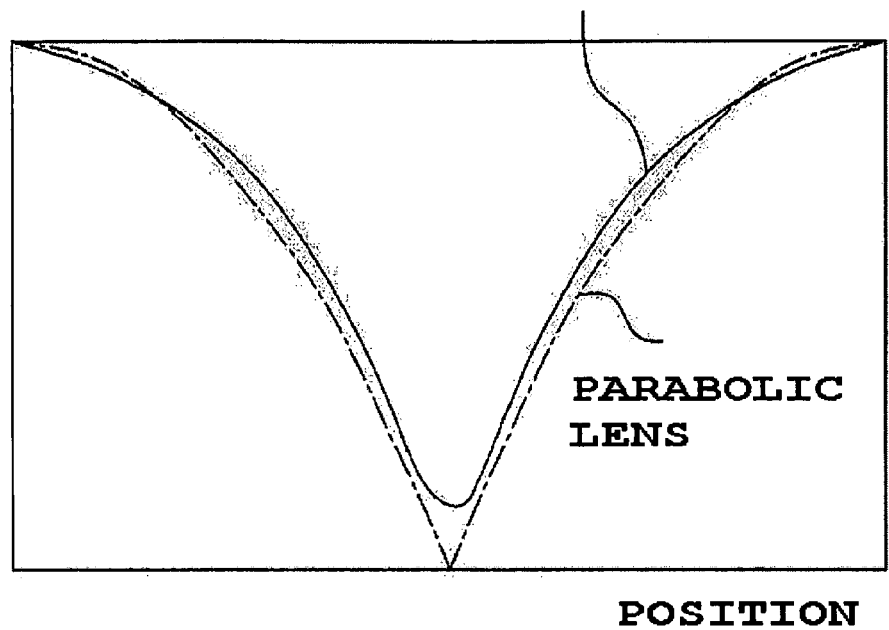
FIGS. 5A and 5B are graphs illustrating phase variation of the electrically-driven electric field lens, respectively, FIG. 5A illustrating the case where no black matrix is provided, and FIG. 5B illustrating the case where a black matrix layer is provided.
Figure 5B:
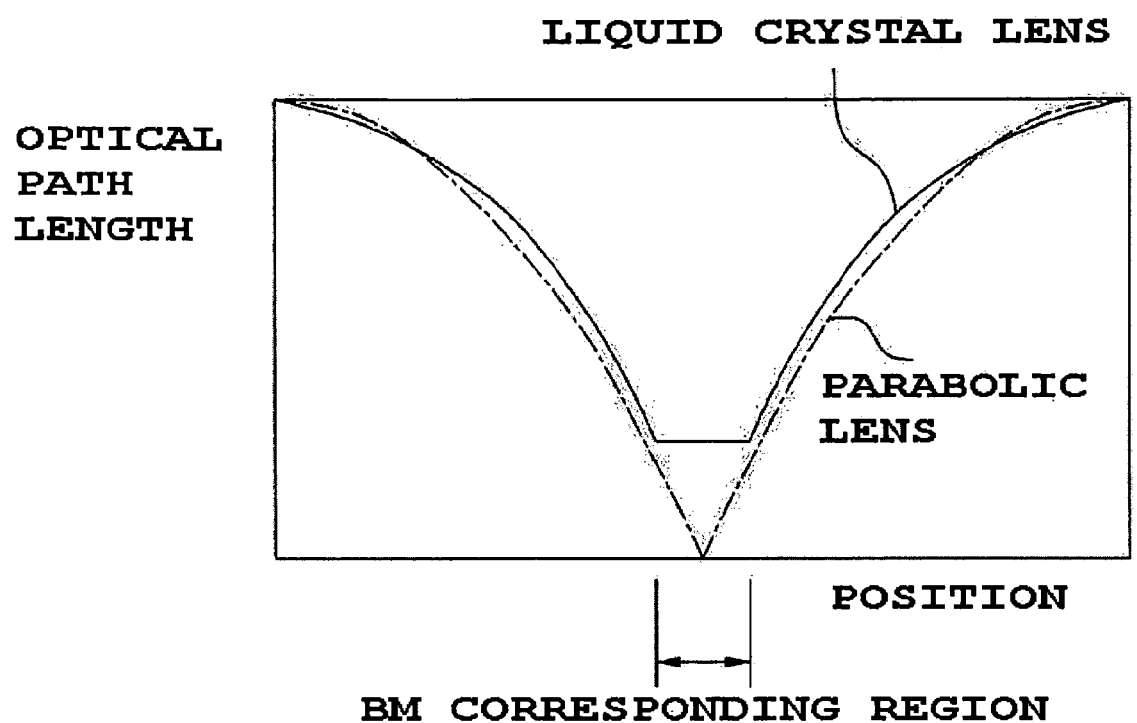

FIGS. 5A and 5B are graphs illustrating phase variation of the electrically-driven electric field lens, respectively. Specifically, FIG. 5A illustrates the case where no black matrix is provided, and FIG. 5B illustrates the case where a black matrix layer is provided.

With relation to the configuration of FIG. 4, FIG. 5A illustrates results comparing the electrically-driven liquid crystal lens with a parabolic lens having no black matrix layer, and FIG. 5B illustrates results comparing the electrically-driven liquid crystal lens with a parabolic lens having the black matrix layer as shown in FIG. 4.

As shown in FIG. 5A, assuming that only the first and second electrodes 101 and 103 are present on the first substrate 100 without the black matrix layer, it can be appreciated that a lens edge (i.e. the center of the second electrode) seriously deviates from an ideal parabolic lens surface as seen in physically formed lens.

On the other hand, as shown in FIG. 5B, it can be appreciated that a specific section, where the black matrix layer 102 is formed, blocks transmission of light, providing a predetermined optical path length, and also, as a result of covering the specific section with the black matrix layer 102, it is possible to prevent crosstalk, which causes distortion of an image at the lens edge.

Figure 6:
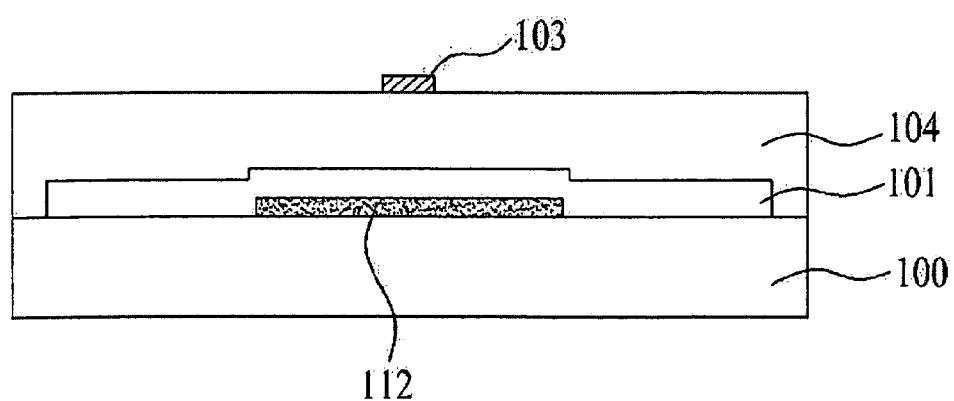
FIG. 6 is a sectional view illustrating an electrically-driven liquid crystal lens according to another embodiment of the present invention.

FIG. 6 is a plan view illustrating a first substrate (i.e. a lower substrate) of the electrically-driven liquid crystal lens according to another embodiment.

The electrically-driven liquid crystal lens as shown in FIG. 6 has the same configuration as the previously-described configuration shown in FIG. 4 except that the black matrix layer 112 is formed on the first substrate 100 prior to forming the first electrodes 101, and thus, a full description of the configuration will be omitted.

Here, the black matrix layer 112 is made of light-tight opaque metal such as chromium (Cr), molybdenum (Mo) and aluminum-neodymium (AlNd). In both the configurations shown in FIGS. 4 and 6, the first electrodes 101 and the black matrix layer 102 or 112 are arranged to come into contact with each other. With this arrangement, it is possible to partially improve resistance caused from the first electrodes 101 that are made of transparent metal.

Meanwhile, peripheral keys (not shown) are formed along an outer rim of the first substrate 100 for alignment of layers to be patterned, respectively. Here, the black matrix layer 112 can be formed simultaneously with the formation of the peripheral keys.

Although FIG. 4 illustrates the first alignment layer 105 formed throughout the insulating layer 104 including the second electrodes 103, FIG. 6 omits illustration of the first alignment layer.

Hereinafter, the effects of the electrically-driven liquid crystal lens will be described.

Figure 7:
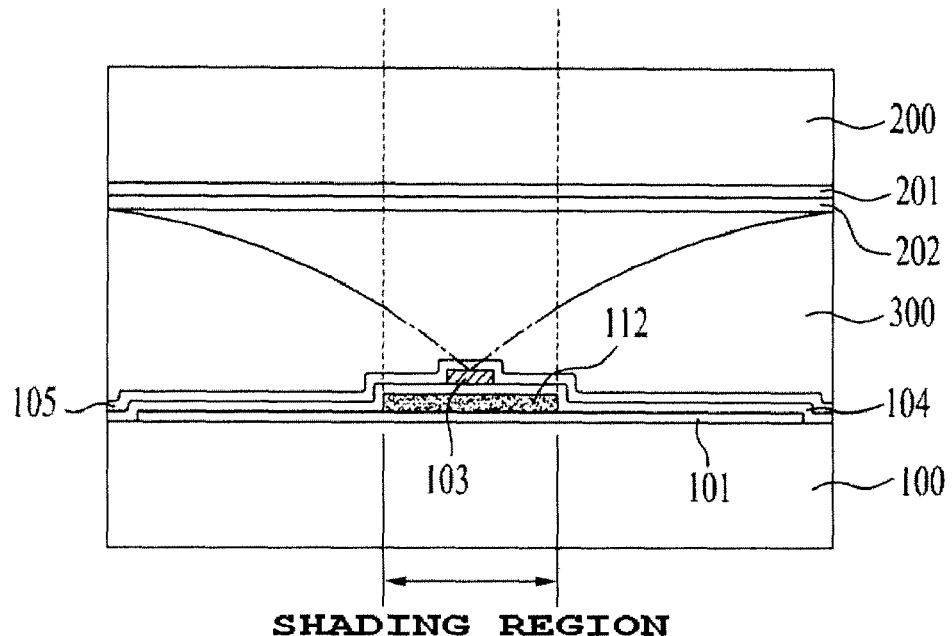
FIG. 7 is a sectional view illustrating the shading effect of the electrically-driven liquid crystal lens according to the present invention.

FIG. 7 is a sectional view illustrating the shading effect of the electrically-driven liquid crystal lens.

As shown in FIG. 7, a majority of the electrically-driven liquid crystal lens, except for the black matrix layer 112, is utilized as a lens. In this case, by covering the second electrodes 103, which correspond to lens edges, with the black matrix layer 112, it is possible to prevent left and right image dots from meeting the lens edges, and consequently, to prevent generation of an abnormal optical path.

In this case, with the provision of the black matrix layer 112, upon formation of the second electrodes 103, an electric field generated between the second electrodes 103 and the third electrode 201 has no effect upon the display of an image at a specific section covered by the black matrix layer 112. In this case, the shape of the second electrodes 103 can be freely selected.

Figure 8:
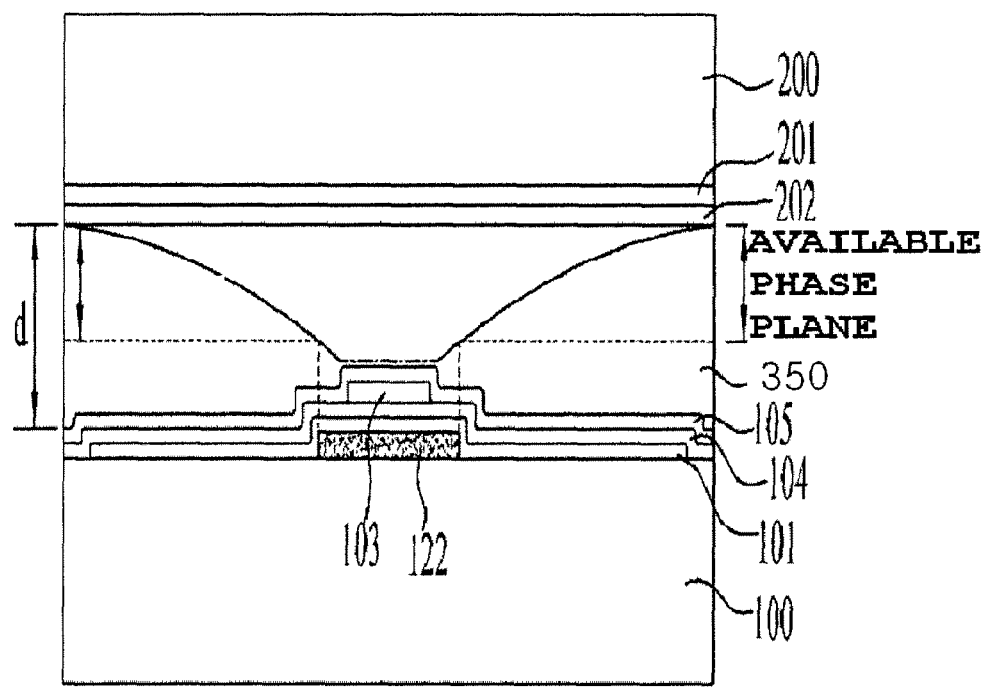
FIG. 8 is a sectional view illustrating the cell-gap reducing effect of the electrically-driven liquid crystal lens according to the present invention.

FIG. 8 is a sectional view illustrating the cell-gap reducing effect of the electrically-driven liquid crystal lens.

As shown in FIG. 8, the electrically-driven liquid crystal lens utilizes only an available phase plane, which has an optical path length obtained by an electric field generated in a majority of the lens except for the specific region covered by the black matrix layer corresponding to the lens edges. The section covered by the black matrix layer is reduced in the thickness of the liquid crystal layer 300, and can minimize the overall cell gap. In this case, it will be appreciated that the cell gap of the liquid crystal layer 300 has a smaller value when the resulting parabolidal surface has a more gentle slope. For this, it is advantageous to increase the width of the second electrodes 103. Here, as the width of the second electrodes 103 is increased, the width of the black matrix layer 102 must be increased, to cover the lens edges.

Figure 9:
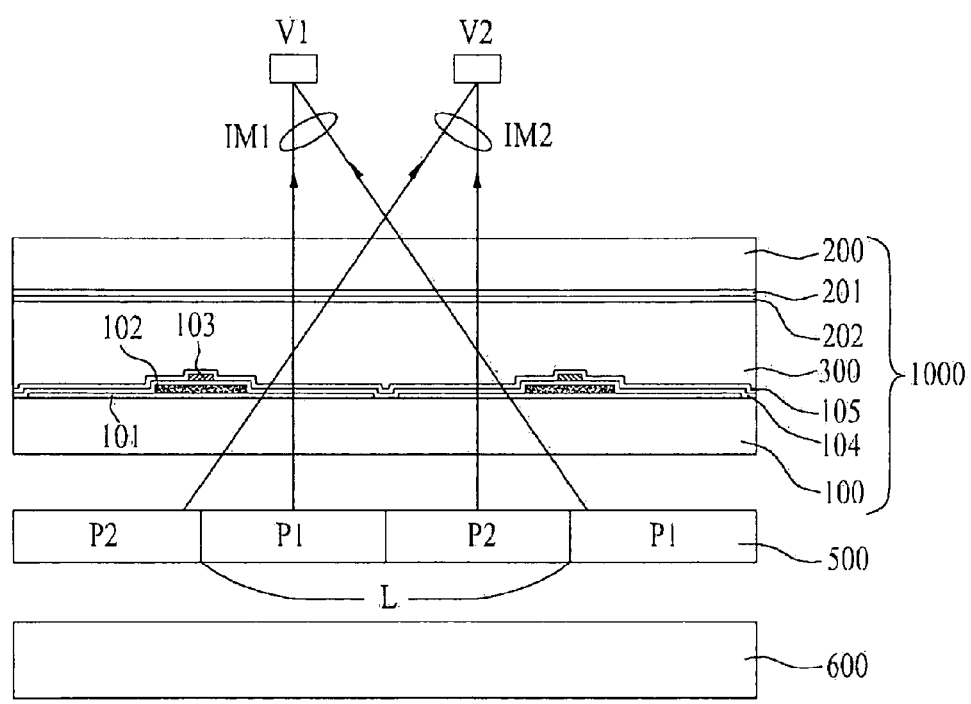
FIG. 9 is a sectional view illustrating an application of the electrically-driven liquid crystal lens according to the present invention to a display device.

FIG. 9 is a sectional view illustrating an application of the electrically-driven liquid crystal lens to a display device.

As shown in FIG. 9, the display device, which adopts an electrically-driven liquid crystal lens, includes an electrically-driven liquid crystal lens 1000, which is driven according to applied voltage and functions as a lens, a display panel 500, which is disposed at the lower surface of the electrically-driven liquid crystal lens 1000 and serves to emit 2-dimensional image information, and a light source 600, which is disposed at the lower surface of the display panel 500 and serves to transmit light to the display panel 500.

As occasion demands, if the display panel 500 is a self-illuminating device, the light source 600 may be omitted.

The display panel 500 includes first image pixels P1 and second image pixels P2, which are alternately and repeatedly arranged in sequence, to display a first image IM1 and a second image IM2, respectively. The display panel 500 can be selected from various flat-panel displays including a liquid crystal display (LCD), organic light emitting display (OLED), plasma display panel (PDP), field emission display (FED), etc.

When a threshold voltage, high voltage, and ground voltage are applied to the first, second, and third electrodes 101, 103 and 201, the electrically-driven liquid crystal lens 1000 acts as a lens similar to a parabolic optical lens. The first and second images IM1 and IM2 emitted from the display panel 500 are transmitted to first and second viewing zones V1 and V2 via the electrically-driven liquid crystal lens 1000. A distance between the first viewing zone V1 and the second viewing zone V2 is set to a distance between a normal pair of human eyes. Thereby, the user can merge the first and second images IM1 and IM2 transmitted to the first and second viewing zones V1 and V2, respectively, thereby perceiving a stereographic 3-dimensional image.

Meanwhile, when no voltage is applied to the first, second, and third electrodes 101, 103 and 201, the electrically-driven liquid crystal lens 1000 serves as a simple transparent layer to display the first and second images IM1 and IM2 of the display panel 500 without refraction, by operations of the first alignment layer 105 which is subjected to rubbing toward the second electrodes 103, the second alignment layer 202 which is aligned intersecting the first alignment layer 105, and the liquid crystal layer 300 which is horizontally aligned from the first alignment layer 105 to the second alignment layer 202. Accordingly, the first and second images IM1 and IM2 can be directly transmitted to the user without regard to the viewing zones, and the user can perceive a 2-dimensional image.

The electrically-driven liquid crystal lens and the display device including the same have the following effects.

Firstly, in realization of a 3-dimensional stereoscopic image display device, the electrically-driven liquid crystal lens, in which liquid crystals are interposed between two substrates and first and second electrodes are formed on inner surfaces of the two substrates, can serve to convert a 2-dimensional image into a 3-dimensional image. In this case, by further providing a black matrix layer to cover the second electrodes formed at lens edges, it is possible to prevent an abnormal optical path caused when left and right image dots overlap the lens edges, and consequently, to prevent crosstalk due to the abnormal optical path. Specifically, at the centers of the respective second electrodes, adjustment of an electric field is difficult, adjustment of an optical path close to zero is difficult, and forming the electrically-driven liquid crystal lens into a parabolic lens is difficult. Therefore, by covering these section, having a risk of an abnormal optical path, with the black matrix layer for light shading, it is possible to prevent erroneous image information from being transmitted to the user.

Secondly, the light-tight black matrix layer is formed to come into contact with the first electrodes formed between the centers of respective neighboring left and right lens regions. This has the effect of reducing the resistance of the first electrodes made of transparent metal.

Thirdly, by increasing the widths of the second electrodes and the black matrix layer to lower a sag of the parabolic lens, it is possible to reduce a cell gap between the first and second substrates. This has the effect of reducing the amount of liquid crystal required to constitute a liquid crystal layer, resulting in reduced manufacturing costs.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An electrically-driven liquid crystal lens comprising:
   first and second substrates arranged opposite each other and defined, respectively, with a plurality of lens regions corresponding to each other;
   first electrodes formed on the first substrate between centers of the respective neighboring left and right lens regions on the first substrate;
   a black matrix layer formed on the first substrate to correspond to edges of the respective lens regions, the black matrix layer having a first width;
   second electrodes formed above the first electrodes to correspond to the edges of the respective lens regions, the second electrodes having a second width smaller than the first width;
   a third electrode formed throughout the second substrate; and a liquid crystal layer interposed between the first substrate and the second substrate.

2. The lens according to claim 1, wherein the first electrodes are formed throughout the first substrate, or are formed between the centers of the respective neighboring left and right lens regions to take the form of an island covering the black matrix layer.

3. The lens according to claim 2, wherein the black matrix layer comes into electric contact with the first electrodes.

4. The lens according to claim 3, wherein the black matrix layer is formed at the upper or lower surface of the first electrodes.

5. The lens according to claim 1, further comprising:
a first alignment layer formed throughout the first substrate including the second electrodes; and
a second alignment layer formed on the third electrode.

6. The lens according to claim 5, wherein the first alignment layer is subjected to rubbing in a longitudinal direction of the second electrodes, and the second alignment layer is subjected to rubbing in a direction intersecting the direction in which the first alignment layer is rubbed.

7. The lens according to claim 1, wherein the first and third electrodes are made of transparent metal.

8. The lens according to claim 7, wherein the second electrodes are made of light-tight opaque metal or transparent metal.

9. The lens according to claim 1, wherein the black matrix layer is made of any one of chromium (Cr), molybdenum (Mo) and aluminum-neodymium (AlNd).

10. The lens according to claim 1, wherein, upon driving of the liquid crystal layer, a threshold voltage is applied to the first electrodes, a high voltage is applied to the second electrodes, and the third electrode is grounded.

11. The lens according to claim 1, wherein, when voltages are applied to the first to third electrodes, the liquid crystal layer between the neighboring second electrodes is aligned to have an optical path following a parabolic phase plane.

12. The lens according to claim 1, wherein the second electrodes are disposed to have a shorter vertical distance than the first electrodes with respect to the third electrode.

13. A display device comprising:
a display panel to emit 2-dimensional first and second images; and
an electrically-driven liquid crystal lens disposed on the display panel and including:
first and second substrates arranged opposite each other and defined, respectively, with a plurality of lens regions corresponding to each other;
first electrodes formed on the first substrate between centers of the respective neighboring left and right lens regions on the first substrate;
a black matrix layer formed on the first substrate to correspond to edges of the respective lens regions, the black matrix layer having a first width;
second electrodes formed above the first electrodes electrode to correspond to the edges of the respective lens regions, the second electrodes having a second width smaller than the first width;
a third electrode formed throughout the second substrate; and
a liquid crystal layer interposed between the first substrate and the second substrate.

* * * * *